Feb. 19, 1952　　　K. E. PEILER　　　2,586,079
STIRRING APPARATUS FOR MOLTEN GLASS IN FOREHEARTHS
Filed June 25, 1949　　　3 Sheets-Sheet 1

INVENTOR
KARL E. PEILER
BY Parham + Bates
ATTORNEYS

Feb. 19, 1952     K. E. PEILER     2,586,079
STIRRING APPARATUS FOR MOLTEN GLASS IN FOREHEARTHS
Filed June 25, 1949     3 Sheets-Sheet 2

INVENTOR
KARL E. PEILER
BY Parham & Bates
ATTORNEYS

Feb. 19, 1952 — K. E. PEILER — 2,586,079
STIRRING APPARATUS FOR MOLTEN GLASS IN FOREHEARTHS
Filed June 25, 1949 — 3 Sheets-Sheet 3

INVENTOR
KARL E. PEILER
BY Parham & Bates
ATTORNEYS

Patented Feb. 19, 1952

2,586,079

UNITED STATES PATENT OFFICE 2,586,079

STIRRING APPARATUS FOR MOLTEN GLASS IN FOREHEARTHS

Karl E. Peiler, West Hartford, Conn., assignor to Emhart Manufacturing Company, a corporation of Delaware Application June 25, 1949, Serial No. 101,374

2 Claims. (Cl. 49—54)

This invention relates to improvements in stirring apparatus having means for supporting and operating refractory stirrers in position for use to stir molten glass in a glass feeder forehearth and more particularly to a supporting and operating means for a plurality of refractory stirrers which depend into a glass forehearth channel at spaced places along a line extending transversely of such channel, substantially as disclosed in Patent No. 2,467,809, granted April 19, 1949, jointly to Madison M. Cannon, Jr., and the present applicant.

Refractory stirrers for stirring molten glass in a forehearth channel or like place wear rapidly in service and must be replaced frequently during the active life of a feeder forehearth. The life of such a stirrer may be a few months at the best and may be only a month or even less. Since stirrers are relatively heavy implements and must be removed from and replaced in a place of high temperature and this while the stirrers themselves are highly heated either because of use in such a hot place, as when stirrers are removed, or because of preheating for replacement, the operation of removing and replacing stirrers from and in a glass feeding forehearth heretofore has been difficult and has been accomplished only at considerable inconvenience and some hazard to a workman or workmen employed in such operation. It also has required considerable time.

An object of the present invention is to provide a supporting and operating means for a plurality of refractory glass stirrers of the character described which will facilitate and make relatively easy the task of removing and replacing such stirrers when required.

A further object of the invention is to provide a supporting and operating means for stirrers of the character described which affords facilities for removal and replacement of stirrers without disassembly or interference with the driving mechanism for rotating the stirrers when they have been installed.

A further object of the invention is the provision in supporting and operating means for stirrers of the character described of simple and effective readily detachable and attachable coupling means for operatively connecting the stirrers with the driving means and disconnecting them therefrom, such coupling means including individual coupling elements fast to the stirrers and each suitable for detachable connection with a cooperative coupling element of an appropriately positioned hoist by which each such stirrer may be raised and moved to an out-of-the-way position after the stirrer has been detached from the driving means.

A still further object of the invention is the provision of supporting and operating means for stirrers of the character described which will position the stirrers in operative positions in a feeder forehearth when the stirrers are operatively connected therewith and also may in part be moved bodily relative to the forehearth and independently of the stirrers when the latter have been detached therefrom so as to provide an adequate clearance space above and around the upper ends of the stirrers to permit convenient removal of the stirrers from the forehearth channel and the installation therein of replacement stirrers.

A further object of the invention is the provision in a supporting and operating means for stirrers of the character described of simple and effective means actively to predetermine the relative angular relationships about their respective axes which the individual stirrers will have when they are operatively positioned in a forehearth channel and connected with their driving means.

Other objects and advantages of the invention hereinafter will be pointed out or will become obvious from the following description of an illustrative embodiment thereof, as shown in the accompanying drawings, in which Fig. 1 is a transverse vertical section through a feeder forehearth equipped with three stirrers which are operatively supported in the forehearth channel by supporting and operating means of the present invention;

Figure 4:
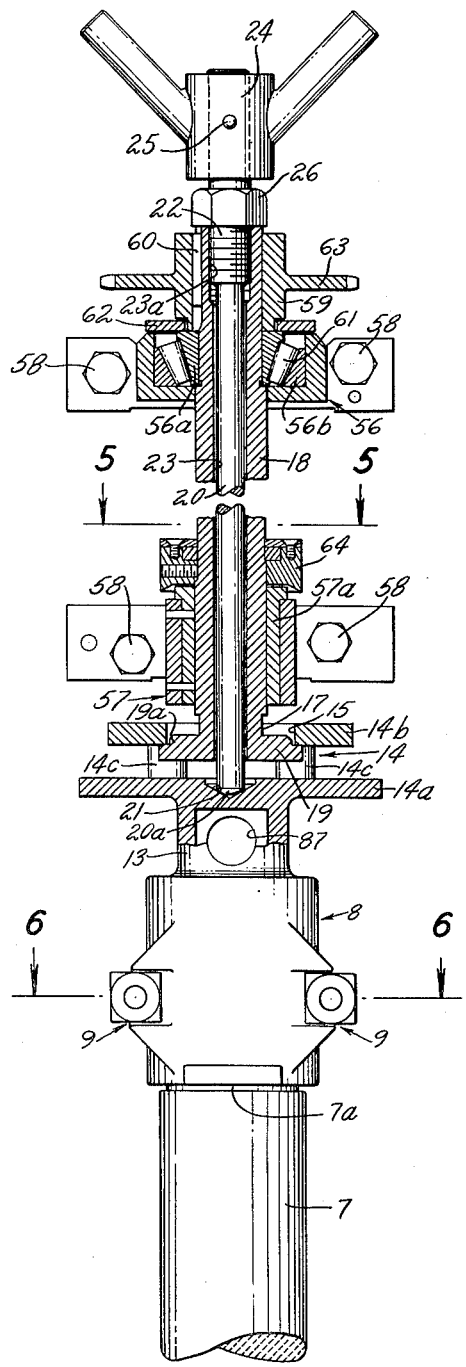
Fig. 4 is a relatively enlarged view, partly in side elevation and partly in vertical section, showing a stirrer spindle of the supporting and operating means together with the means for detachably coupling the stirrer to the spindle.
Figure 5:
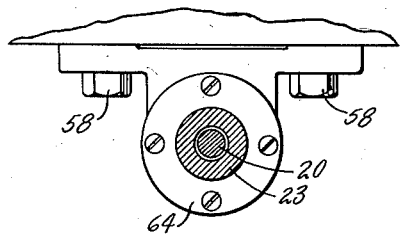
Fig. 5 is a transverse section through the spindle substantially along the line 5—5 of Fig. 4.
Figure 6:
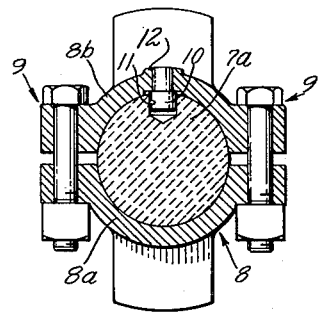
Figure 7:
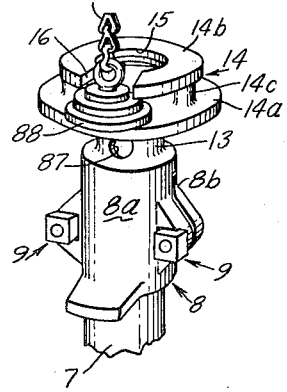

Fig. 6 is a transverse section through a chuck and the upper portion or shank of a stirrer held therein, the view being along the line 6—6 of Fig. 4; and Fig. 7 is a perspective view of the stirrer chuck and a fragmentary portion of a stirrer held therein, together with a coupling element of a hoist engageable with a coupling head on the stirrer chuck after the latter has been detached from its supporting and operating means.

Figure 1:
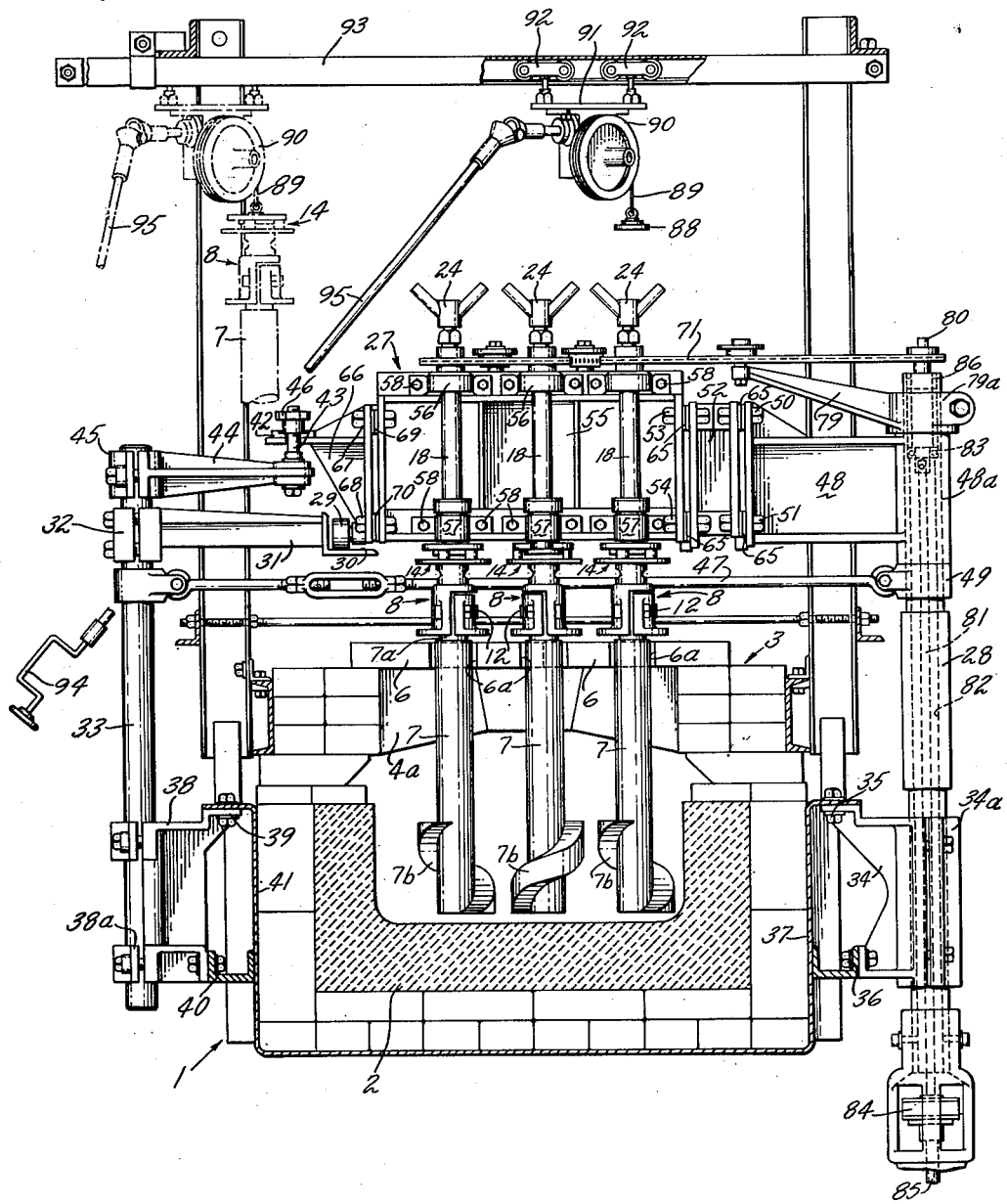

Referring now to the drawings and more particularly to Fig. 1, the numeral 1 generally designates a glass feeder forehearth to which stirrer supporting and operating mechanism of the present invention may be applied. Such a forehearth may comprise a channel structure 2 in which a stream of molten glass (not shown) may flow.

Figure 2:
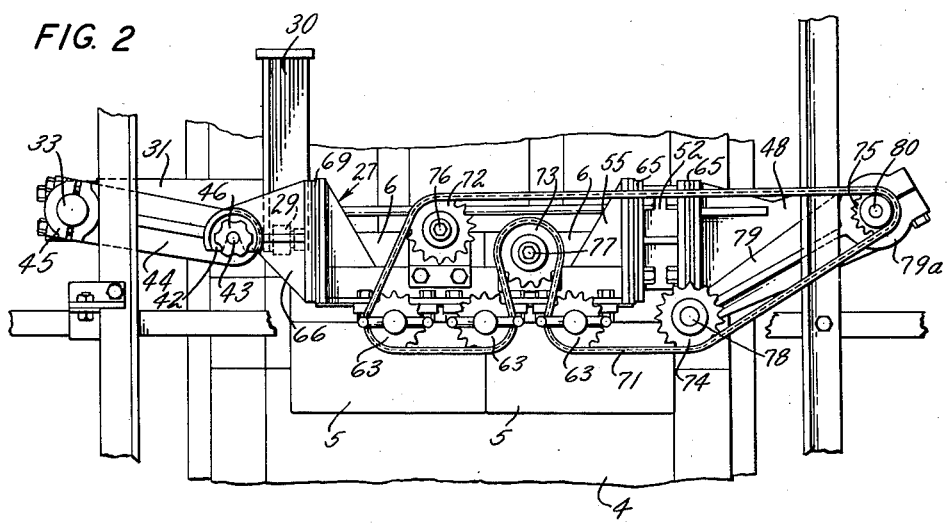
Fig. 2 is a fragmentary plan view of the portion of the forehearth provided with the stirrers and stirrer supporting and operating means, the view showing such supporting and operating means in operative position.
Figure 3:
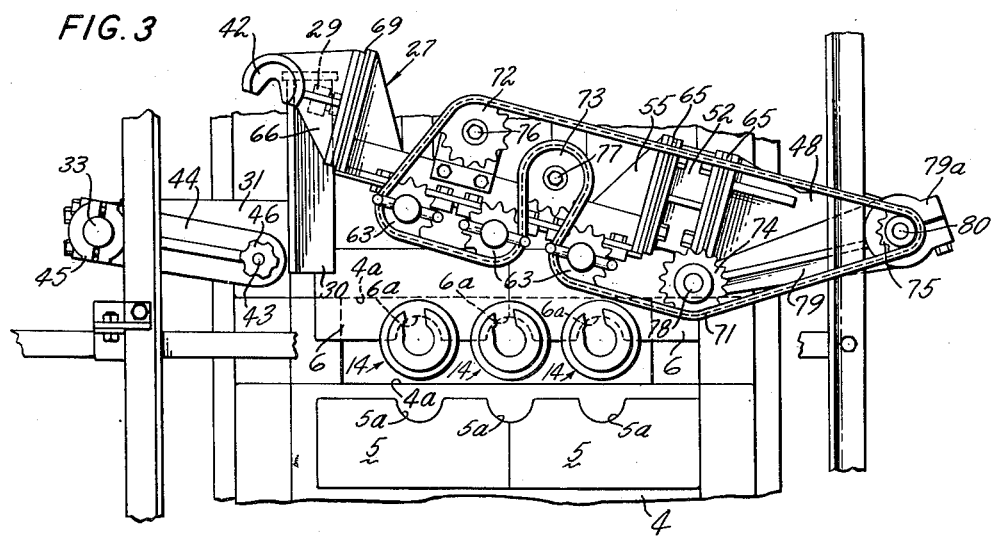
Fig. 3 is a view like Fig. 2 but showing the stirrers detached from the supporting and operating means and a supporting arm of the latter in a rearwardly swung out-of-the-way position above the forehearth.

The channel structure is surmounted by a cover structure 3 including a roof 4, Figs. 2 and 3, spanning the space above the forehearth channel. This roof 4 may comprise cooperative contiguous or abutting relatively fore-and-aft refractory cover slabs or blocks 5 and 6, respectively, which are formed at suitable places along their meeting edges with substantially semi-circular notches or recesses 5a and 6a therein, cooperating to provide circular openings in the forehearth roof to accommodate with some clearance the upper end portions of refractory vertical stirrers 7, as shown in Fig. 1, when the cooperative relatively fore-and-aft blocks 5 and 6 are closed or abutting each other as shown in Fig. 2. The blocks 5 and 6 are independently and relatively movable on the forehearth roof 4 so that the more forwardly located blocks 5 or the rear blocks 6 or both may be moved apart, thereby exposing a clearance gap 4a, Figs. 1 and 3, in the forehearth roof for ready access to and manipulation of stirrers to be removed and for their replacement by new stirrers.

Each stirrer 7 is an elongate refractory implement, the upper end portion, 7a, of which may be of relatively reduced diameter and is adapted to fit a split-collar type chuck 8. Each of these chucks comprises two cooperative sections 8a and 8b, respectively, which together embrace the portion 7a of a stirrer shank and are clamped to the latter by fastening means 9 which secure the sections of the chuck together in a manner conventional in a split-collar type of chuck. The stirrer shank and the chuck may be further secured together by an inwardly projecting pin or dowel 10 carried by one of the chuck sections, as the section 8b, in position to enter a suitably formed recess 11 in the stirrer shank. The elements 10 and 11 serve as a means for locating the stirrer in a desired angularly turned position in its chuck and this position is indicated by an index element which is shown in Fig. 6 as a slightly raised annular boss 12 around the outer end of and axially aligned with the fastening pin or dowel 10.

One of these chuck sections, as the section 8a, has an upwardly extending integral attaching portion 13 terminating in a coupling head 14. The coupling head 14 comprises a flange 14a having its axis aligned with the lower clamping portion, 8a—8b, of the chuck and preferably is of greater diameter than such clamping portion. It thus may shield parts located above and in line therewith from heat radiated from below. A second and smaller flange 14b is located above and in axial alignment with the flange 14a and is connected therewith by suitably spaced connecting webs or rods 14c which may be integral with the flanges 14a and 14b. The flange 14b is provided with a central opening 15 having a side entrance in the form of a radial slot 16. This slot is of sufficient width to permit movement therethrough of a portion, designated 17, of a spindle 18 so as to dispose a coupling flange 19 on the lower end of the spindle within the confines of the coupling head 14 between the flanges 14a and 14b of the chuck when coupling of the chuck to the spindle 18 is to be effected. As shown in Fig. 4, the peripheral edge of the coupling flange 19 of the spindle may be slightly reduced at 19a at its top to fit in the lower end of the central opening 15 of the chuck coupling flange 14b when the spindle and chuck coupling elements are operatively engaged with each other. The chuck and the stirrer carried thereby thus will be firmly attached to the spindle for movements therewith when relative axial movements of the chuck and spindle from their coupled together positions are prevented, as by means now described.

The spindle 18 is tubular and a locking rod 20 extends downwardly therethrough. The lower end of such rod may be beveled or rounded, as indicated at 20a, to bear against a cooperatively shaped bottom of a cavity 21 in the top of the lower flange 14a of the chuck coupling head. The rod 20 is provided near its upper end with a relatively enlarged screw threaded portion 22 in threaded engagement with a threaded relatively enlarged or counterbored upper end portion 23a of the bore 23 of the tubular spindle 18. The rod may be turned about its axis in the spindle 18 in a direction to exert a downward thrust on the chuck flange 14a and a like upward thrust on the spindle. This will lock the chuck in place on the lower end of the spindle. To permit uncoupling of these parts, it only is necessary to turn the rod 20 about its axis in the spindle in the reverse direction until the lower end of the rod is spaced above the flange 14a. For convenient operation of the rod 20, it may be provided at its upper end portion with an operating handle or part 24 which is shown as resembling a wing nut and as fastened to the rod 20 by a pin 25. A jam nut 26 may be provided on the screw threaded upper portion of the rod 20 and may be tightened against the upper end of the tubular spindle when the rod is in its locking position, as shown in Fig. 4.

A chuck, spindle and locking means as described are provided for each of the stirrers 7. The spindles are carried by a supporting arm, generally indicated at 27 in Fig. 1. This supporting arm is pivotally supported at one end on an upright supporting post 28 at one side of the forehearth so that such arm may extend transversely across and in overhanging relation to the forehearth channel. Provision is made at the opposite side of the forehearth channel to anchor the free end of the arm when it is disposed transversely across the forehearth channel in position to support the stirrers suspended therefrom in transversely spaced relation along a line extending transversely of the forehearth channel. The free end of the arm 27 carries a roller 29 resting upon a horizontally disposed flat support 30 which is carried by an arm 31 fastened at 32 to an upright support or post 33 at the opposite side of the forehearth from the post 28. In the structure shown, the post 28 is carried by a bracket 34 which is fastened, as at 35 and 36, to a stationary support 37 which may be part of the forehearth channel framework or casing. The post 33 is carried by a bracket 38 secured at 39 and 40 to a support 41 which also may be part of the framework or casing of the forehearth channel structure. The brackets 34 and 38 are shown as comprising split-collar type clamps 34a and 38a, respectively, of substantial vertical extent holding the posts 28 and 33, respectively, so that these posts may be adjusted vertically within limits. Any other suitable known means firmly to support these posts in predetermined positions at opposite sides of the forehearth may be employed.

When the arm 27 extends transversely across the forehearth channel at an approximate right angle therewith as in Figs. 1 and 2, it may be retained in that position by a hook-shaped latching element 42 on its free end engaged with an upwardly extending latch post 43 on a bracket arm 44 which is attached at 45 to the upper end portion of the post 33. A nut 46 in threaded engagement with the upper end portion of the latch post 43 may be screwed downwardly onto the latching member 42 so as to exert sufficient downward pressure thereon to prevent its accidentally disengaging the latch post 43.

The posts 28 and 33 may be stayed or braced to each other by an adjustable tie rod 47.

The overhanging arm 27 may take various structural forms. In the example shown, it comprises a plurality of sections firmly secured together to provide a strong and rigid entity. Thus, the arm 27 comprises an inner end section 48, Fig. 1, having a vertical sleeve portion 48a mounted on a portion of the post 28 above a fixed position collar 49 on the latter. The collar 49 also may serve as an attaching means for one end of the tie rod 47. The inner end section 48 of the arm 27 is attached, as at 50 and 51, to a spacing section 52 which is attached at 53 and 54 to an intermediately located main or carrier section 55 by which the spindles 18 are supported. The spindles 18 are journaled in vertically spaced upper and lower anti-friction bearings 56 and 57, respectively, which are firmly attached, by suitable fastening means 58 to the carrier section 55. As appears from Fig. 4, each upper bearing 56 may be a roller-bearing type unit and the spindle may be supported against downward axial movement relative to this bearing unit by the thrust against the top of a downwardly tapering inner ring element 56a of the bearing unit of a collar 59 which is fixed by a key 60 on the spindle directly above the bearing unit. The inner ring element 56a turns with the spindle on the rollers 61 in the outer ring element 56b of the bearing unit, the latter being fixed in position on the carrier section 55 of the supporting arm 27 as hereinbefore described. A cover 62 of annular form may be provided on the top of the bearing unit 56 to prevent spilling or throwing of oil or other lubricant from the bearing unit during rotation of the spindle. The cover may be retained against upward displacement by the collar 59. In the example shown, the collar 59 also is the hub of a sprocket 63 for rotating the spindle about its axis.

The lower bearing unit 57 preferably is of a type that need not be lubricated in service, this for the reason that lubricants applied thereto would be likely to carbonize and cause seizure in the high temperature to which the lower bearing unit will be subjected in service. The bearing unit 57 has an inner bushing, indicated at 57a, of a composition including graphite or other suitable known substance having good lubricating properties. An oil guard 64, which may be of any suitable known construction, is mounted on the spindle directly over the bearing unit 57 to catch any oil or lubricant running down the spindle.

The carrier section 55 of the arm 27 will support the spindles and the stirrers depending from such spindles in predetermined suitable positions along a line extending transversely of the forehearth channel when the arm 27 is in its operative position as shown in Figs. 1 and 2 and the spindles are rotatably supported on the carrier section by the bearing units 56—57 in the relative positions shown in Fig. 1. Shims 65 may be used at the joints between the inner end section 48 and the spacing section 52 and between the spacing section 52 and the carrier section 55, respectively, if needed in any installation for positioning of the carrier section 55 transversely of a forehearth.

The latching member 42 is carried by an end section 66 of the arm 27, this end section being attached at 67 and 68 to the outer end of the carrier section 55. Shims also may be used at the joints 69 and 70 between the carrier section 55 and the outer end section 66 of the arm 27 to position the latching member 42 precisely as desired for engagement with the latch post 43.

Driving of the spindles in unison about their respective axes may be effected by a chain 71 which is trained about the sprockets 63 on the several spindles, idle sprockets 72, 73 and 74 and a drive sprocket 75. The idle sprockets 72 and 73 are mounted on upright studs 76 and 77, respectively, on the overhanging arm 27 in the positions shown in relation to each other and to the several sprockets 63. The idle sprocket 74 is carried by an upstanding stud 78 on a bracket arm 79 projecting from and fastened, as by a split-collar type clamp 79a, on the upper end of the portion 48a of the arm 27 so as to turn with the latter about the axis of the post 28. The drive sprocket 75 is fast on the upper end portion 80 of a vertical shaft 81 which extends downwardly through a bore 82 of the post 28 which is tubular for its full length as shown, Fig. 1. The shaft 81 may be journaled in an anti-friction bearing unit assembly, indicated at 83, in the upper end portion of the tubular post 28, provision being made as is conventional to resist any downward thrust or tendency of the shaft. The shaft 81 is connected at the lower end of the tubular post 28 through an overload release clutch 84 with a drive shaft 85 which may be rotated by power from any suitable source (none shown). This source obviously may be a conventional motor and speed reduction unit and the arrangement may be such as to turn the driving shaft 85 and the parts operated thereby in the direction desired, as in a clockwise direction as viewed looking downward at the top of the upper end portion 80 of the shaft 81 in Fig. 1. A conventional oil seal unit 86 may be mounted on the shaft 81 above the collar portion 79a of the bracket arm 79 to prevent oil being thrown or forced upwardly from the bearing assembly.

As shown in Fig. 1, the chucks of the left hand and middle stirrers have their index elements 12 directly in line and facing each other while the index element 12 of the chuck of the right hand stirrer is turned away from the middle stirrer and also is in line transversely of the forehearth channel. This arrangement positions screw threaded lower end portions, 7b, of the stirrers in the desired angularly related positions is respect to one another for effective coaction with one another in stirring and acting on the glass in the forehearth channel when the stirrers are rotated about their respective axes by the driving means described.

The attaching portion 13 of each of the stirrer chucks is provided with a transverse opening 87, Fig. 4, in its side through which a laterally turned end or hook of a suitable iron rod or implement (not shown) may be inserted when manually effected movement of the chuck and its attached stirrer relative to the chuck supporting spindle is to be effected, as in uncoupling the chuck from its spindle for replacement of the stirrer. When such replacement is to be effected, the driving means is stopped to stop rotation of the stirrers. The rods 20 which lock the spindle coupling elements to the chuck coupling heads are loosened. The chucks are turned by manually operated tongs or like tool to position the open slots 16 in the chuck coupling heads at the upstream side thereof. The forehearth cover blocks 5 and 6 then are moved apart. The chucks with their attached stirrers then are uncoupled from their spindles in succession by use of the aforesaid rod or implement having a laterally turned end portion or hook insertable through the opening 87 of each chuck in its turn, the rod then being manipulated as a lever to lift the chuck and its stirrer slightly relative to their spindle, then laterally to free the chuck from its spindle, and then downwardly to lower the stirrer until it rests upright on the floor of the forehearth channel.

When all three stirrers have been disconnected from their spindles in this manner, the nut 46 may be loosened to permit disengagement of the latching hook 42 from the latching post 43. The free end of the arm 27, carrying the spindles and the parts of the drive mounted thereon, then may be swung rearwardly of the forehearth channel as a unit to the position shown in Fig. 3, the supporting roller 29 rolling on the support 30. The upper ends of the chucks on the stirrers then will be freely accessible. A cooperative coupling flange 88 on the lower end of a cable 89 of a hoist 90 having a carirage 91 movably supported by the wheel assemblies 92 on an overhead horizontal rail 93 now is attached to the coupling head 14 of the chuck of the stirrer next to the left hand side of the forehearth channel as viewed in Fig. 1. The hoist is then operated, as by the crank handle 94 of the remote control operating rod 95, Fig. 1, to raise the attached chuck and its stirrer vertically from the forehearth to a level at which it may be moved to one side of the forehearth by an appropriate movement of the hoist 91 on the overhead rail 93 without striking any structure on the forehearth roof. The removed stirrer then is detached from the hoist and the operations just described are repeated until all the stirrers to be replaced have been removed from the forehearth.

A preheated stirrer having its chuck applied thereto then is attached to the hoist and the latter is manipulated to lower the stirrer slowly into the glass in the forehearth to position the stirrer approximately in line downstream from its spindle and so that the open slot in the chuck coupling is turned upstream or toward its spindle. After the required number of replacement stirrers have been similarly placed in the forehearth channel, the arm 27 is returned to its active position and latched in place. The stirrers then are raised in turn, beginning with the right hand stirrer in the channel as viewed in Fig. 1, and are coupled to their spindles. They then should be turned to proper angularly adjusted positions and locked to their spindles in the manner and by the means hereinbefore described. The rod having an end portion engageable with the openings 87 in the chuck coupling heads may be used to raise and manipulate the chucks and their attached stirrers to couple them to their spindles. The cover blocks of the forehearth roof structure are then replaced.

It thus is apparent that removal and replacement of heavy refractory stirrers from and in a forehearth have been greatly facilitated by the present invention and that the operations involved which require manual action may be effected without hazard or physical discomfort to the workman employed.

The number of stirrers in an assembly to be supported by an overhanging arm as herein described may be varied according to the width of the forehearth for which intended or because of individual preference or particular service conditions. The illustrative structure shown in the drawings and hereinbefore described may be varied and modified otherwise in many respects which now will be obvious to those skilled in the art. I, therefore, do not wish to be limited to such details.

I claim:

1. Glass stirring apparatus comprising, in combination with a glass feeder forehearth, a substantially horizontal supporting arm, an upright at one side of the forehearth pivotally supporting said arm at one end thereof to position said arm above and in overhanging relation to said forehearth, a plurality of spaced vertical spindles rotatably mounted on said arm in positions above and spaced transversely of the forehearth, latching means to releasably retain said arm in a position transverse of the forehearth, elongate refractory stirring implements of the same number as said spindles, each of said implements being formed at one end for glass stirring action, individual chucks for the implements secured thereon at the ends thereof opposite their stirring ends, said chucks having external index elements related in position angularly around the axes of the implements to the glass stirring end portions of the implements, coupling members on the lower ends of the spindles and rigid therewith, coupling heads on the chucks rigid therewith and engageable with the spindle coupling members to suspend the chucks and their stirring implements from the spindles and so that said chucks and stirrers can be turned angularly about their axes in relation to their spindles to adjust the stirring end portions of the implements in predetermined angularly adjusted positions in relation to one another and as indicated by the relative positions about the same axes of the index elements on the chucks, means to lock said spindle coupling members and the engaged chuck spindle heads rigidly together to maintain said angularly adjusted relative positions of the stirring implements and so that said stirring implements will be rotated with their spindles when the latter are rotated, and driving means operatively connected with said spindles to rotate them in unison about their individual axes.

2. Glass stirring apparatus comprising, in combination with a glass feeder forehearth, a substantially horizontal supporting arm, an upright at one side of the forehearth pivotally supporting said arm at one end thereof in overhanging relation to said forehearth, a plurality of vertical spindles rotatably mounted on said arm in positions spaced therealong and above the forehearth, latching means to releasably retain said arm in a position transverse of the forehearth, elongate refractory stirring implements for the several spindles, each of said stirring implements having a spiral stirring element thereon adjacent to one end and being formed at its opposite end to fit in a holding chuck, individual holding chucks for the implements secured on the second-named ends thereof, an upstanding coupling head on each chuck rigid therewith, said coupling head comprising two vertically spaced integrally formed flanges, having a side entrance to the space therebetween, the upper of said flanges having a central bore and a radial slot wider than the diameter of its spindle extending from the bore through the periphery thereof above and in line with the entrance to the space between said flanges, a cooperative coupling flange on the lower end of each spindle and rigid therewith, said spindle coupling flange having a diameter greater than that of the central bore in the upper flange of the chuck coupling head and less than the width of the side entrance to the space between the flanges of the chuck coupling head, whereby said spindle and the chuck may be coupled together or uncoupled by relative movements therebetween to insert the spindle coupling flange laterally between the flanges of the chuck coupling head or to remove it therefrom, said spindle having an axial bore extending through the coupling flange at the lower end thereof, a vertical locking rod extending through the spindle bore to bear at its lower end against the lower flange of the coupling head of a chuck coupled thereto, said rod being threadedly engaged with an internal portion of the spindle, and an operating handle on the rod above the spindle operable to turn the rod in engagement with the spindle and in pressure applying contact with the lower flange of the chuck coupling head to hold the spindle coupling flange locked in place against the upper flange of the chuck coupling head, and means operatively connected with said spindles to rotate them in unison about their individual axes.

KARL E. PEILER.

REFERENCES CITED

The following references are of record in the file of this patent:

UNITED STATES PATENTS

| Number | Name | Date |
|---|---|---|
| 191,417 | Foster | May 29, 1877 |
| 984,850 | Rathbun | Feb. 21, 1911 |
| 2,217,182 | Peiler | Oct. 8, 1940 |
| 2,238,800 | Mueller | Apr. 15, 1941 |
| 2,467,809 | Cannon et al. | Apr. 19, 1949 |

FOREIGN PATENTS

| Number | Country | Date |
|---|---|---|
| 187,836 | Great Britain | Nov. 2, 1922 |